United States Patent
Bruck et al.

(10) Patent No.: US 9,352,413 B2
(45) Date of Patent: May 31, 2016

(54) DEPOSITION OF SUPERALLOYS USING POWDERED FLUX AND METAL

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 550 days.

(21) Appl. No.: 13/755,064

(22) Filed: Jan. 31, 2013

(65) Prior Publication Data
US 2013/0140278 A1   Jun. 6, 2013

Related U.S. Application Data

(63) Continuation-in-part of application No. 13/005,656, filed on Jan. 13, 2011.

(51) Int. Cl.
*B23K 26/34* (2014.01)
*B23K 25/00* (2006.01)
*B23K 9/04* (2006.01)
*B23K 10/02* (2006.01)
(Continued)

(52) U.S. Cl.
CPC .............. *B23K 25/005* (2013.01); *B23K 9/044* (2013.01); *B23K 10/027* (2013.01); *B23K 15/0093* (2013.01); *B23K 26/144* (2015.10); *B23K 26/1411* (2013.01); *B23K 26/32* (2013.01); *B23K 26/322* (2013.01); *B23K 26/3206* (2013.01); *B23K 26/3293* (2013.01); *B23K 26/34* (2013.01); *B23K 26/342* (2015.10); *B23K 26/345* (2013.01); *B23K 35/0244* (2013.01); *B23K 35/0266* (2013.01);
(Continued)

(58) Field of Classification Search
CPC ...... B23K 25/005; B23K 26/34; B23K 9/044; B23K 10/027; B23K 15/0093; B23K 26/1411; B23K 26/3206; B23K 26/3293; B23K 26/345; B23K 2201/001; C23C 24/10; C23C 26/02
See application file for complete search history.

(56) References Cited

U.S. PATENT DOCUMENTS 3,448,241 A   6/1969   Buckingham
3,627,979 A   12/1971   Quaas
(Continued)

FOREIGN PATENT DOCUMENTS

JP          2-205664 A   *   8/1990
JP          4-210886 A   *   7/1992
WO    WO-2014/085892 A1 *   6/2014

OTHER PUBLICATIONS

Geddes et al., "Superalloys:alloys and Performance", Nov. 2010, Materials Information Society.*
(Continued)

*Primary Examiner* — Geoffrey S Evans

(57) ABSTRACT

A method for depositing superalloy materials. A layer of powder (14) disposed over a superalloy substrate (12) is heated with an energy beam (16) to form a layer of superalloy cladding (10) and a layer of slag (18). The layer of powder includes flux material and alloy material, formed either as separate powders or as a hybrid particle powder. A layer of powdered flux material (22) may be placed over a layer of powdered metal (20), or the flux and metal powders may be mixed together (36). An extrudable filler material (44) such as nickel, nickel-chromium or nickel-chromium-cobalt wire or strip may be added to the melt pool to combine with the melted powder to give the superalloy cladding the composition of a desired superalloy material.

19 Claims, 3 Drawing Sheets

(51) Int. Cl.
  B23K 15/00     (2006.01)
  B23K 26/14     (2014.01)
  C23C 24/10     (2006.01)
  C23C 26/02     (2006.01)
  B23K 26/32     (2014.01)
  B23K 35/30     (2006.01)
  B23K 35/36     (2006.01)
  B23K 35/362    (2006.01)
  B23P 6/00      (2006.01)
  B23K 35/02     (2006.01)

(52) U.S. Cl.
  CPC .............. *B23K 35/30* (2013.01); *B23K 35/304* (2013.01); *B23K 35/3033* (2013.01); *B23K 35/36* (2013.01); *B23K 35/362* (2013.01); *B23P 6/00* (2013.01); *C23C 24/10* (2013.01); *C23C 26/02* (2013.01); *B23K 2201/001* (2013.01); *B23K 2201/34* (2013.01); *B23K 2203/50* (2015.10)

(56) References Cited

U.S. PATENT DOCUMENTS

| | | | |
|---|---|---|---|
| 4,331,857 A | 5/1982 | Crisci | |
| 4,741,974 A | 5/1988 | Longo | |
| 6,539,620 B1 | 4/2003 | Smashey | |
| 6,750,430 B2 | 6/2004 | Kelly | |
| 6,916,387 B2 | 7/2005 | Lulofs | |
| 7,653,995 B2 | 2/2010 | Morin | |
| 2005/0120941 A1 | 6/2005 | Hu et al. | |
| 2009/0280269 A1* | 11/2009 | Bewlay et al. | 427/596 |
| 2010/0116793 A1 | 5/2010 | Grüger et al. | |
| 2012/0181255 A1 | 7/2012 | Bruck | |
| 2012/0234798 A1* | 9/2012 | Lin et al. | 219/137 R |
| 2012/0325786 A1* | 12/2012 | Tolling et al. | 219/121.64 |
| 2015/0050157 A1* | 2/2015 | Ozbaysal et al. | 416/241 R |

OTHER PUBLICATIONS

Hofman, "Development of an observation and Control System for Industrial Laser Cladding", Dec. 2009, Ipskamp Drukkers BVC, ISBN # 978-90-77172-42-1, pp. 1-189.*

G. J. Bruck, A Study of Fluxing Agents In High Power Laser Beam Cladding, , Mar. 7, 1989, Westinghouse R&D Center, Pittsburgh, Pennsylvania.

Konrad Wissenbach, Presentation of EC Project FANTASIA, Mar. 31, 2011, Fraunhofer Institute for Laser Technology, Aachen, Germany.

* cited by examiner

DEPOSITION OF SUPERALLOYS USING POWDERED FLUX AND METAL

This application is a continuation-in-part of pending U.S. patent application Ser. No. 13/005,656 filed on 13 Jan. 2011 (publication number US 2012/0181255 A1), incorporated by reference herein.

FIELD OF THE INVENTION

This invention relates generally to the field of metals joining, and more particularly to the welding clad buildup and repair of superalloy materials.

BACKGROUND OF THE INVENTION

Welding processes vary considerably depending upon the type of material being welded. Some materials are more easily welded under a variety of conditions, while other materials require special processes in order to achieve a structurally sound joint without degrading the surrounding substrate material.

Common arc welding generally utilizes a consumable electrode as the feed material. In order to provide protection from the atmosphere for the molten material in the weld pool, an inert cover gas or a flux material may be used when welding many alloys including, e.g. steels, stainless steels, and nickel based alloys. Inert and combined inert and active gas processes include gas tungsten arc welding (GTAW) (also known as tungsten inert gas (TIG)) and gas metal arc welding (GMAW) (also known as metal inert gas (MIG) and metal active gas (MAG)). Flux protected processes include submerged arc welding (SAW) where flux is commonly fed, flux cored arc welding (FCAW) where the flux is included in the core of the electrode, and shielded metal arc welding (SMAW) where the flux is coated on the outside of the filler electrode.

The use of energy beams as a heat source for welding is also known. For example, laser energy has been used to melt pre-placed stainless steel powder onto a carbon steel substrate with powdered flux material providing shielding of the melt pool. The flux powder may be mixed with the stainless steel powder or applied as a separate covering layer. To the knowledge of the inventors, flux materials have not been used when welding superalloy materials.

It is recognized that superalloy materials are among the most difficult materials to weld due to their susceptibility to weld solidification cracking and strain age cracking. The term "superalloy" is used herein as it is commonly used in the art; i.e., a highly corrosion and oxidation resistant alloy that exhibits excellent mechanical strength and resistance to creep at high temperatures. Superalloys typically include a high nickel or cobalt content. Examples of superalloys include alloys sold under the trademarks and brand names Hastelloy, Inconel alloys (e.g. IN 738, IN 792, IN 939), Rene alloys (e.g. Rene N5, Rene 80, Rene 142), Haynes alloys, Mar M, CM 247, CM 247 LC, C263, 718, X-750, ECY 768, 282, X45, PWA 1483 and CMSX (e.g. CMSX-4) single crystal alloys.

Weld repair of some superalloy materials has been accomplished successfully by preheating the material to a very high temperature (for example to above 1600° F. or 870° C.) in order to significantly increase the ductility of the material during the repair. This technique is referred to as hot box welding or superalloy welding at elevated temperature (SWET) weld repair, and it is commonly accomplished using a manual GTAW process. However, hot box welding is limited by the difficulty of maintaining a uniform component process surface temperature and the difficulty of maintaining complete inert gas shielding, as well as by physical difficulties imposed on the operator working in the proximity of a component at such extreme temperatures.

Some superalloy material welding applications can be performed using a chill plate to limit the heating of the substrate material; thereby limiting the occurrence of substrate heat affects and stresses causing cracking problems. However, this technique is not practical for many repair applications where the geometry of the parts does not facilitate the use of a chill plate.

FIG. 6 is a conventional chart illustrating the relative weldability of various alloys as a function of their aluminum and titanium content. Alloys such as Inconel® IN718 which have relatively lower concentrations of these elements, and consequentially relatively lower gamma prime content, are considered relatively weldable, although such welding is generally limited to low stress regions of a component. Alloys such as Inconel® IN939 which have relatively higher concentrations of these elements are generally not considered to be weldable, or can be welded only with the special procedures discussed above which increase the temperature/ductility of the material and which minimize the heat input of the process. A dashed line 80 indicates a recognized upper boundary of a zone of weldability. The line 80 intersects 3 wt. % aluminum on the vertical axis and 6 wt. % titanium on the horizontal axis. Alloys outside the zone of weldability are recognized as being very difficult or impossible to weld with known processes, and the alloys with the highest aluminum content are generally found to be the most difficult to weld, as indicated by the arrow.

It is also known to utilize selective laser melting (SLM) or selective laser sintering (SLS) to melt a thin layer of superalloy powder particles onto a superalloy substrate. The melt pool is shielded from the atmosphere by applying an inert gas, such as argon, during the laser heating. These processes tend to trap the oxides (e.g. aluminum and chromium oxides) that are adherent on the surface of the particles within the layer of deposited material, resulting in porosity, inclusions and other defects associated with the trapped oxides. Post process hot isostatic pressing (HIP) is often used to collapse these voids, inclusions and cracks in order to improve the properties of the deposited coating.

For some superalloy materials in the zone of non-weldability there is no known acceptable welding or repair process. Furthermore, as new and higher alloy content superalloys continue to be developed, the challenge to develop commercially feasible joining processes for superalloy materials continues to grow.

BRIEF DESCRIPTION OF THE DRAWINGS

The invention is explained in the following description in view of the drawings that show.

DETAILED DESCRIPTION OF THE INVENTION

The present inventors have developed a materials joining process that can be used successfully to join and/or repair the most difficult to weld superalloy materials. While flux materials have not previously been utilized when welding superalloy materials, embodiments of the inventive process advantageously apply a powdered flux material over a superalloy substrate during a melting and re-solidifying process. Some embodiments also utilize the precise energy input control capability of energy beam heating processes, such as laser beam heating. The powdered flux material is effective to provide beam energy trapping, impurity cleansing, atmospheric shielding, bead shaping, and cooling temperature control in order to accomplish crack-free joining of superalloy materials without the necessity for high temperature hot box welding or the use of a chill plate or the use of inert shielding gas. While various elements of the present invention have been known in the welding industry for decades, the present inventors have innovatively developed a combination of steps for a superalloy joining process that solves the long-standing problem of cracking of these materials.

Figure 1:
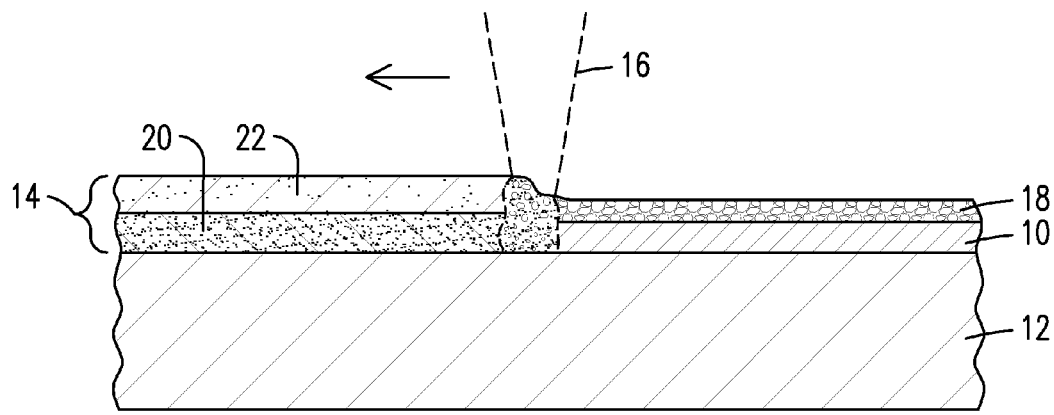
FIG. 1 illustrates a cladding process in accordance with an embodiment of the invention using a multi-layer powder.

FIG. 1 illustrates an embodiment of the present invention where a layer of cladding 10 of a superalloy material is being deposited onto a superalloy substrate material 12 at ambient room temperature without any preheating of the substrate material 12 or the use of a chill plate. The substrate material 12 may form part of a gas turbine engine blade, for example, and the cladding process may be part of a repair procedure in some embodiments. A layer of granulated powder 14 is pre-placed on the substrate 12, and a laser beam 16 is traversed across the layer of powder 14 to melt the powder and to form the layer of cladding 10 covered by a layer of slag 18. The cladding 10 and slag 18 are formed from the layer of powder 14 which includes a layer of powdered superalloy material 20 covered by a layer of powdered flux material 22.

The flux material 22 and resultant layer of slag 18 provide a number of functions that are beneficial for preventing cracking of the cladding 10 and the underlying substrate material 12. First, they function to shield both the region of molten material and the solidified (but still hot) cladding material 10 from the atmosphere in the region downstream of the laser beam 16. The slag floats to the surface to separate the molten or hot metal from the atmosphere, and the flux may be formulated to produce a shielding gas in some embodiments, thereby avoiding or minimizing the use of expensive inert gas. Second, the slag 18 acts as a blanket that allows the solidified material to cool slowly and evenly, thereby reducing residual stresses that can contribute to post weld reheat or strain age cracking. Third, the slag 18 helps to shape the pool of molten metal to keep it close to a desired 1/3 height/width ratio. Fourth, the flux material 22 provides a cleansing effect for removing trace impurities such as sulfur and phosphorous that contribute to weld solidification cracking. Such cleansing includes deoxidation of the metal powder. Because the flux powder is in intimate contact with the metal powder, it is especially effective in accomplishing this function. Finally, the flux material 22 may provide an energy absorption and trapping function to more effectively convert the laser beam 16 into heat energy, thus facilitating a precise control of heat input, such as within 1-2%, and a resultant tight control of material temperature during the process. Additionally, the flux may be formulated to compensate for loss of volatized elements during processing or to actively contribute elements to the deposit that are not otherwise provided by the metal powder itself. Together, these process steps produce crack-free deposits of superalloy cladding on superalloy substrates at room temperature for materials that heretofore were believed only to be joinable with a hot box process or through the use of a chill plate.

Figure 2:
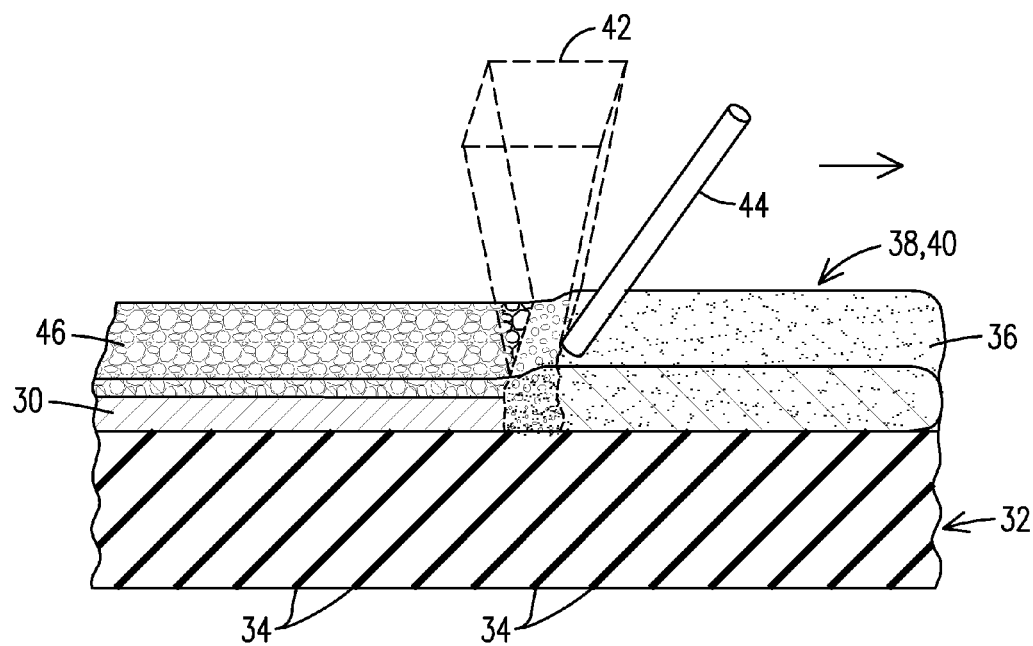
FIG. 2 illustrates a cladding process using a mixed layer powder.

FIG. 2 illustrates another embodiment of the invention where a layer of cladding 30 of a superalloy material is being deposited onto a superalloy substrate material 32, which in this embodiment is illustrated as a directionally solidified material having a plurality of columnar grains 34. In this embodiment, the layer of powder 36 is pre-placed or fed onto the surface of the substrate material 32 as a homogeneous layer including a mixture of both powdered alloy material 38 and powdered flux material 40. The layer of powder 36 may be one to several millimeters in thickness in some embodiments rather than the fraction of a millimeter typical with known selective laser melting and sintering processes. Typical powdered prior art flux materials have particle sizes ranging from 0.5-2 mm, for example. However, the powdered alloy material 38 may have a particle size range (mesh size range) of from 0.02-0.04 mm or 0.02-0.08 mm or other sub-range therein. This difference in mesh size range may work well in the embodiment of FIG. 1 where the materials constitute separate layers; however, in the embodiment of FIG. 2, it may be advantageous for the powdered alloy material 38 and the powdered flux material 40 to have overlapping mesh size ranges, or to have the same mesh size range in order to facilitate mixing and feeding of the powders and to provide improved flux coverage during the melting process.

The energy beam 42 in the embodiment of FIG. 2 is a diode laser beam having a generally rectangular cross-sectional shape, although other known types of energy beams may be used, such as electron beam, plasma beam, one or more circular laser beams, a scanned laser beam (scanned one, two or three dimensionally), an integrated laser beam, etc. The rectangular shape may be particularly advantageous for embodiments having a relatively large area to be clad, such as for repairing the tip of a gas turbine engine blade. The broad area beam produced by a diode laser helps to reduce weld heat input, heat affected zone, dilution from the substrate and residual stresses, all of which reduce the tendency for the cracking effects normally associated with superalloy repair. Optical conditions and hardware optics used to generate a broad area laser exposure may include but are not limited to: defocusing of the laser beam; use of diode lasers that generate rectangular energy sources at focus; use of integrating optics such as segmented mirrors to generate rectangular energy sources at focus; scanning (rastering) of the laser beam in one or more dimensions; and the use of focusing optics of variable beam diameter (e.g. 0.5 mm at focus for fine detailed work varied to 2.0 mm at focus for less detailed work). The motion of the optics and/or substrate may be programmed as in a selective laser melting or sintering process to build a custom shape layer deposit. Advantages of this process over known laser melting or sintering processes include: high deposition rates and thick deposit in each processing layer; improved shielding that extends over the hot deposited metal without the need for inert gas; flux will enhance cleansing of the deposit of constituents that otherwise lead to solidification cracking; flux will enhance laser beam absorption and minimize reflection back to processing equipment; slag formation will shape and support the deposit, preserve heat and slow the cooling rate, thereby reducing residual stresses that otherwise contribute to strain age (reheat) cracking during post weld heat treatments; flux may compensate for elemental losses or add alloying elements, and powder and flux pre-placement or feeding can efficiently be conducted selectively because the thickness of the deposit greatly reduces the time involved in total part building.

The embodiment of FIG. 2 also illustrates the use of a base alloy feed material 44. The feed material 44 may be in the form of a wire or strip that is fed or oscillated toward the substrate 32 and is melted by the energy beam 42 to contribute to the melt pool. If desired, the feed material may be preheated (e.g. electrically) to reduce overall energy required from the laser beam. While it is difficult or impossible to form some superalloy materials into wire or strip form, materials such as pure nickel or nickel-chromium or nickel-chromium-cobalt are readily available in those forms. In the embodiment of FIG. 2, the base alloy feed material 44, powdered alloy material 38 and powdered flux material 40 are advantageously selected such that the layer of cladding material 30 has the composition of a desired superalloy material. The filler material may be only an extrudable subset of elements of a composition of elements defining a desired superalloy material, and the powdered metal material includes elements that complement the elements in the filler material to complete the composition of elements defining the desired superalloy material. The filler material and the powdered metal material are combined in the melt pool to form the repaired surface of desired superalloy material 30. As in FIG. 1, the process produces a layer of slag 46 that protects, shapes and thermally insulates the layer of cladding material 30.

Figure 3:
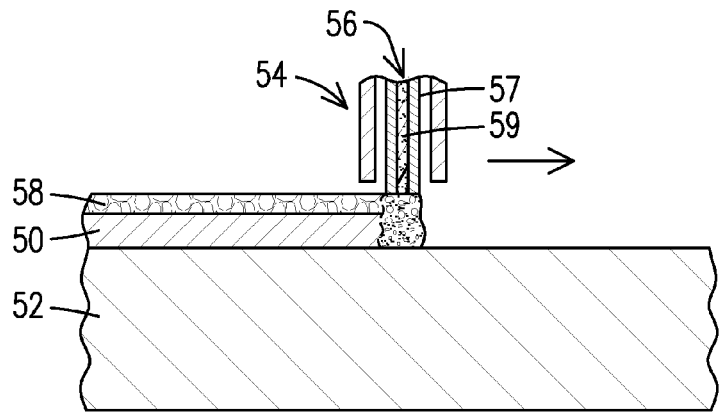
FIG. 3 illustrates a cladding process using a cored filler wire and a cold metal arc welding torch.

FIG. 3 illustrates an embodiment where a layer of superalloy material 50 is deposited onto a superalloy substrate 52 using a cold metal arc welding torch 54. The torch 54 is used to feed and to melt a filler material 56 having the form of a cored wire or strip material including a hollow metal sheath 57 filled with a powdered material 59. The powdered material 59 may include powdered metal alloy and/or flux materials. Advantageously, the metal sheath 57 is formed of a material that can be conveniently formed into a hollow shape, such as nickel or nickel-chromium or nickel-chromium-cobalt, and the powdered material 59 is selected such that a desired superalloy composition is formed when the filler material 56 is melted. The sheath contains sufficient nickel (or cobalt) to achieve the desired superalloy composition, thus the solid to solid ratio of sheath verses powdered core material may be maintained at a ratio of 3:2, for example. The heat of the arc melts the filler material 56 and forms a layer of the desired superalloy material 50 covered by a layer of slag 58. Powdered flux material may be provided in the filler material 56 (for example 25% of the core volume) or it may be pre-placed or deposited onto the surface of the substrate 52 (not shown—see FIG. 2), or both. In various embodiments, the flux may be electrically conductive (electroslag) or not (submerged arc), and it may be chemically neutral or additive. As before, the filler material may be preheated to reduce process energy required—in this case from the cold metal arc torch. The use of flux would provide shielding thereby reducing or eliminating the need for inert or partially inert gas commonly required in the cold metal arc process.

Figure 4:
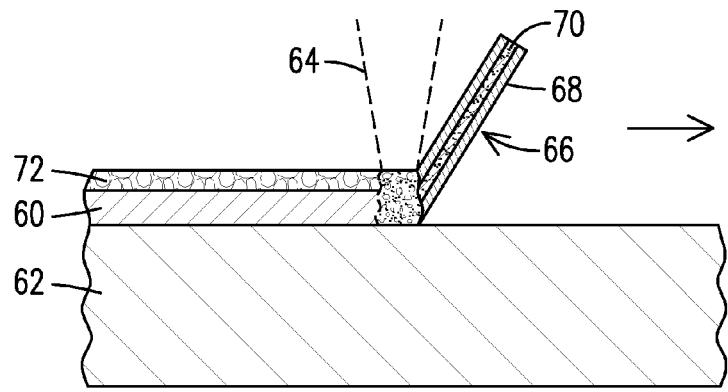
FIG. 4 illustrates a cladding process using a cored filler wire and an energy beam.

FIG. 4 illustrates an embodiment where a layer of superalloy material 60 is deposited onto a superalloy substrate 62 using an energy beam such as laser beam 64 to melt a filler material 66. As described above with respect to FIG. 3, the filler material 66 includes a metal sheath 68 that is constructed of a material that can be conveniently formed into a hollow shape, such as nickel or nickel-chromium or nickel-chromium-cobalt, and a powdered material 70 is selected such that a desired superalloy composition is formed when the filler material 66 is melted by the laser beam 64. The powdered material 70 may include powdered flux as well as alloying elements. The heat of the laser beam 64 melts the filler material 66 and forms a layer of the desired superalloy material 60 covered by a layer of slag 72. As before, the filler material may be preheated to reduce process energy required—in this case from the laser beam.

One embodiment of a filler material 56, 66 is formulated to deposit alloy 247 material as follows:
  sheath solid volume is about 60% of total metallic solid volume and is pure Ni;
  core metal powder volume is about 40% of total metallic solid volume including sufficient Cr, Co, Mo, W, Al, Ti, Ta, C, B, Zr and Hf; that when melted together and mixed with the pure nickel from the sheath, produces alloy 247 composition of nominal weight percent 8.3 Cr, 10 Co, 0.7 Mo, 10 W, 5.5 Al, 1 Ti, 3 Ta, 0.14 C, 0.015 B, 0.05 Zr and 1.5 Hf; and
  core flux powder volume represents additional, largely non-metallic, wire volume possibly about equal in size to the metal powder volume and includes alumina, fluorides and silicates in a 35/30/35 ratio. The mesh size range of the flux is such as to distribute uniformly within the core metal powder.

For embodiments where the heat of melting is provided by an arc, it is common to provide carbon dioxide in the flux or shielding gas in order to maintain arc stability. However, the carbon dioxide will react with titanium and some of the titanium will be lost as vapor or oxides during the melting process. The present invention allows the amount of titanium included in the filler material to be in excess of the amount of titanium desired in the deposited superalloy composition to compensate for this loss. For the example of alloy 247 described above, the amount of titanium included in the core metal powder may be increased from 1% to 3%.

Repair processes for superalloy materials in accordance with embodiments of the present invention may include preparing the superalloy material surface to be repaired by grinding as desired to remove defects, cleaning the surface, then pre-placing or feeding a layer of powdered material containing flux material onto the surface, then traversing an energy beam across the surface to melt the powder and an upper layer of the surface into a melt pool having a floating slag layer, then allowing the melt pool and slag to solidify. The melting functions to heal any surface defects at the surface of the substrate, leaving a renewed surface upon removal of the slag typically by known mechanical and/or chemical processes. The powdered material may be only flux material, or for embodiments where a layer of superalloy cladding material is desired, the powdered material may contain metal powder, either as a separate layer placed under a layer of powdered flux material, or mixed with the powdered flux material, or combined with the flux material into composite particles, such that the melting forms the layer of cladding material on the surface. Optionally, a feed material may be introduced into the melt pool in the form of a strip or wire. The powdered metal and feed material (if any), as well as any metal contribution from the flux material which may be neutral or additive, are combined in the melt pool to produce a cladding layer having the composition of a desired superalloy material. In some embodiments, a feed material of nickel, nickel-chromium, nickel-chromium-cobalt or other conveniently extruded metal is combined with appropriate alloying metal powders to produce the desired superalloy composition in the cladding, thereby avoiding the problem of forming the desired superalloy material into a wire or strip form.

While pre-heating of the substrate is not necessarily required to obtain acceptable results, it may be desired to apply heat to the superalloy substrate and/or to the feed material and/or the powder prior to the melting step in some embodiments, such as to increase the ductility of the substrate material and/or to reduce beam energy otherwise required to melt the filler. Ductility improvement of some superalloy substrates is achieved at temperatures above about 80% of the alloy's melting point. Similarly, a chill fixture could optionally be used for particular applications, which in combination with the precision heat input of an energy beam can minimize stresses created in the material as a result of the melting process. Furthermore, the present invention negates the need for an inert shielding gas, although supplemental shielding gas may be used in some applications if preferred. If a filler material 44 is used, it may be pre-heated in some embodiments.

Flux materials which could be used include commercially available fluxes such as those sold under the names Lincolnweld P2007, Bohler Soudokay NiCrW-412, ESAB OK 10.16 or 10.90, Special Metals NT100, Oerlikon OP76, Sandvik 50SW or SAS1. The flux particles may be ground to a desired smaller mesh size range before use. Any of the currently available iron, nickel or cobalt based superalloys that are routinely used for high temperature applications such as gas turbine engines may be joined, repaired or coated with the inventive process, including those alloys mentioned above.

Other variations of the invention may provide the heat for melting through the feed material rather than or in combination with an energy beam. For example, the wire or strip feed material 44 of FIG. 2 may be energized to create an arc under the layer of powder and flux, with the wire being a material that is readily available in extruded form (i.e. not a superalloy material) and the powder including the other alloying elements necessary to form a desired superalloy composition in the combined melt pool. Alternatively, the powder and flux may be selected to be conductive such as to facilitate an electro-slag welding process effective to form the layer of superalloy cladding material. In yet another embodiment, flux powder mixed with superalloy powder material may be fed to a superalloy substrate using conventional plasma arc cladding equipment, optionally with a chill fixture. The substrate, feed material and/or powder may be preheated in various embodiments. Because the degree of precision of the heat input is higher with the energy beam (±1-2%) than with an electrode (±10-15%), it may be desirable to utilize the energy beam for more than half of the total heat input. The beam energy may lead the submerged arc or electroslag process to initiate a preliminary melt pool with minimum dilution from the substrate, then the submerged arc or electroslag contribution can add to the volume of deposit without significant further substrate impact, thereby minimizing dilution effects.

Figure 6:
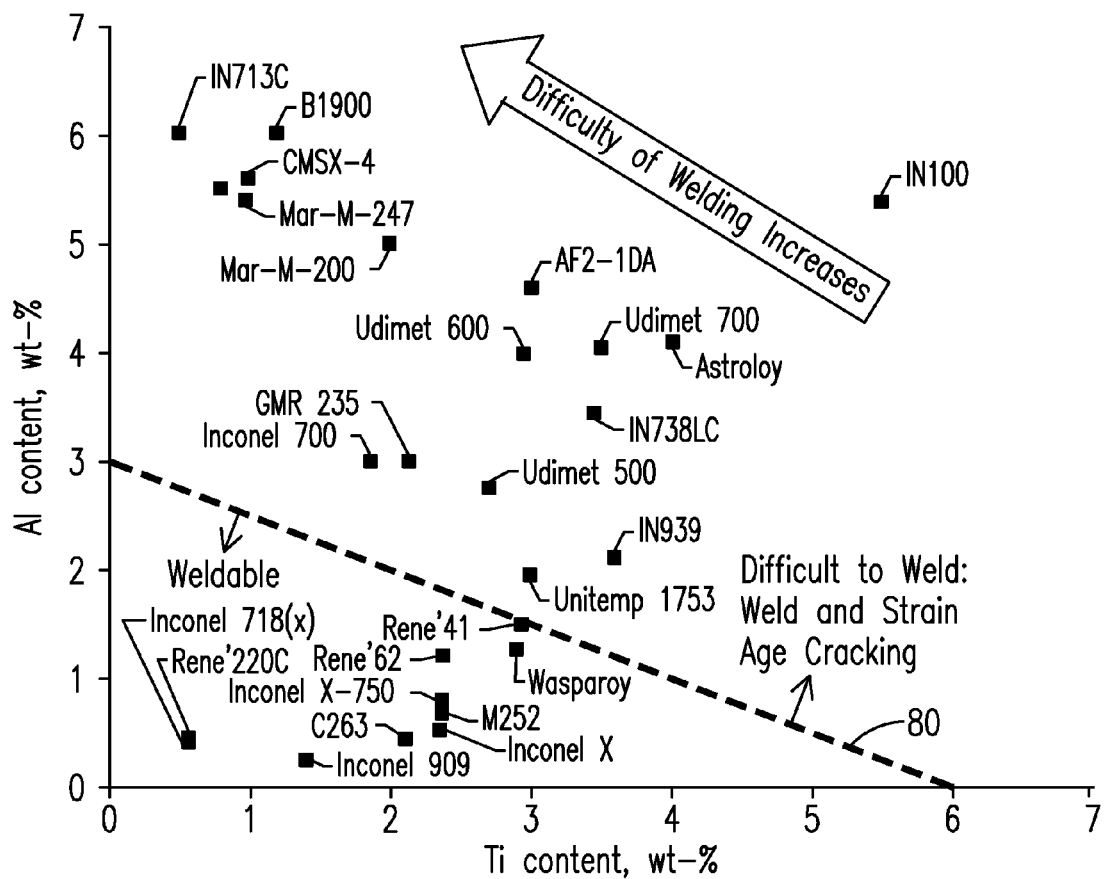
FIG. 6 is a prior art chart illustrating the relative weldability of various superalloys.

In accordance with embodiments of the invention, mixed submerged arc welding flux and alloy 247 powder was pre-placed from 2.5 to 5.5 mm depths and demonstrated to achieve crack free laser clad deposits after final post weld heat treatment. Ytterbium fiber laser power levels from 0.6 up to 2 kilowatts have been used with galvanometer scanning optics making melt pool deposits from 3 to 10 mm in width at travel speeds on the order of 125 mm/min. Absence of cracking has been confirmed by dye penetrant testing and metallographic examination of deposit cross sections. It will be appreciated that alloy 247 is among the most difficult to weld of known superalloys, as illustrated in FIG. 6, thereby demonstrating the operability of the invention for a full range of superalloy compositions, including those with aluminum content of greater than 3 wt. %.

It is appreciated that the advantages of utilizing powdered flux material when repairing a superalloy substrate are realized whether or not an additive cladding material is deposited. Surface cracks in a superalloy substrate may be repaired by covering the surface with powdered flux material, then heating the surface and the flux material to form a melt pool with a floating slag layer. Upon solidification of the melt pool under the protection of the slag layer, a clean surface with no cracks will be formed.

Figure 5:
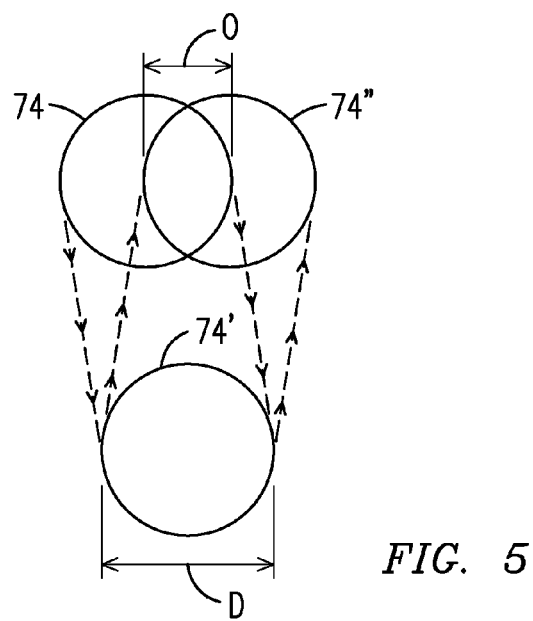
FIG. 5 illustrates an energy beam overlap pattern.

Laser energy may be applied across a surface area by using a diode laser having a generally rectangular energy density. Alternatively, it is possible to raster a circular laser beam back and forth as it is moved forward along a substrate to effect an area energy distribution. FIG. 5 illustrates a rastering pattern for one embodiment where a generally circular beam having a diameter D is moved from a first position 74 to a second position 74' and then to a third position 74" and so on. An amount of overlap O of the beam diameter pattern at its locations of a change of direction is preferably between 25-90% of D in order to provide optimal heating and melting of the materials. Alternatively, two energy beams may be rastered concurrently to achieve a desired energy distribution across a surface area, with the overlap between the beam patterns being in the range of 25-90% of the diameters of the respective beams.

It will be appreciated that the use of powdered material facilitates the deposition of functionally graded materials, where the composition of the deposited material varies across time and space. For example, the alloy composition may vary from an interior wall to an exterior wall of a product, or from within a product to near it's surfaces. The alloy composition may be varied in response to anticipated operating conditions requiring different mechanical or corrosion resistance properties, and with consideration of the cost of the materials.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:
1. A method comprising:
pre-placing or feeding a layer of powdered material consisting essentially of flux material and superalloy material onto a substrate superalloy material, the substrate superalloy material comprising a composition beyond a zone of weldability defined on a graph of superalloys plotting titanium content verses aluminum content, wherein the zone of weldability is upper bounded by a line intersecting the titanium content axis at 6 wt. % and intersecting the aluminum content axis at 3 wt. %;
without preheating the substrate superalloy material, melting the powdered material with an energy beam to form a melt pool and floating slag layer, the melt pool having a composition of a desired superalloy material comprising a composition beyond the zone of weldability;
allowing the melt pool and slag layer to cool and solidify, leaving a layer of the desired superalloy material clad over the substrate superalloy material; and
post weld heat treating the clad layer of the desired superalloy material and the substrate superalloy material without weld solidification cracking and strain age cracking.

2. The method of claim 1, further comprising:
pre-placing the layer of powdered material as mixed flux and superalloy powder to a depth from 2.5 to 5.5 mm; and
melting the powdered material with laser energy at a power level from 0.6 to 2 kilowatts using scanning optics to form melt pool deposits from 3 to 10 mm in width.

3. The method of claim 1, further comprising feeding a filler material into the melt pool during the step of melting in order to add melted filler material to the melt pool;
   wherein the filler material comprises only an extrudable subset of elements of the desired superalloy material; and
   wherein the powdered material comprises elements that complement the subset of elements to form the desired superalloy material in the melt pool.

4. The method of claim 3, further comprising applying heat during the step of melting by passing an electrical current between the filler material and the substrate.

5. The method of claim 1, further comprising pre-placing the layer of powdered material as a layer of powdered metal material covered by a layer of powdered flux material.

6. The method of claim 1, further comprising pre-placing the layer of powdered material as a layer of composite particles of flux and metal material.

7. The method of claim 1, further comprising pre-placing the layer of powdered material as a layer of powder comprising particles of metal material mixed with particles of flux material.

8. The method of claim 7, further comprising selecting a mesh size range of the particles of metal material and the particles of flux material to overlap.

9. A method comprising:
   covering a portion of a surface of a superalloy substrate with a layer of powder consisting essentially of flux material and superalloy metal material;
   melting the powder with an energy beam applied to the layer of powder at room temperature to create a melt pool and floating slag; and
   allowing the melt pool to cool and solidify under the slag to form a repaired surface of a desired superalloy material.

10. The method of claim 9 performed at room temperature, wherein both the superalloy substrate and the repaired surface of the desired superalloy material have an aluminum content of greater than 3 wt. %, and further comprising post weld heat treating the repaired surface and substrate without inducing weld solidification cracking or strain age cracking.

11. The method of claim 9, wherein the melting step comprises applying a laser beam to the powder.

12. The method of claim 9, further comprising covering the portion of the surface with a layer of powdered metal material covered by a layer of powdered flux material.

13. The method of claim 9, further comprising covering the portion of the surface with a layer of powder comprising composite particles of flux and metal material.

14. The method of claim 9, further comprising covering the portion of the surface with a layer of powder comprising particles of metal material mixed with particles of flux material.

15. The method of claim 14, further comprising selecting a mesh size range of the particles of metal material and the particles of flux material to overlap.

16. The method of claim 9, further comprising feeding a filler material in the form of wire or strip into the melt pool during the step of melting in order to add melted filler material to the melt pool;
   wherein the filler material comprises only an extrudable subset of elements of a composition of elements defining the desired superalloy material;
   wherein the powder comprises elements that complement the subset of elements in the filler material to complete the composition of elements defining the desired superalloy material;
   wherein the filler material and the powder are combined in the melt pool to form the repaired surface of desired superalloy material.

17. The method of claim 16, further comprising feeding the filler material in the form of nickel, nickel-chromium or nickel-chromium-cobalt wire or strip.

18. The method of claim 16, further comprising preheating the filler material prior to the step of feeding the filler material into the melt pool.

19. The method of claim 9, wherein the desired superalloy material lies beyond a zone of weldability defined on a graph of superalloys plotting titanium content verses aluminum content, wherein the zone of weldability is upper bounded by a line intersecting the titanium content axis at 6 wt. % and intersecting the aluminum content axis at 3 wt. %.

* * * * *